(12) United States Patent
Ishizu

(10) Patent No.: US 6,870,826 B1
(45) Date of Patent: Mar. 22, 2005

(54) MULTICARRIER TRANSFER SYSTEM AND MULTICARRIER MODULATION METHOD

(75) Inventor: Fumio Ishizu, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/557,160

(22) Filed: Apr. 25, 2000

(30) Foreign Application Priority Data

May 17, 1999 (JP) .......................................... 11-135951

(51) Int. Cl.$^7$ .............................. H04J 1/00; H04J 3/16; H04J 3/22
(52) U.S. Cl. ........................ 370/343; 370/465; 370/480
(58) Field of Search ................................ 370/343, 344, 370/465, 480, 203, 208, 342, 479; 375/130, 132, 133, 135, 140, 141, 146

(56) References Cited

U.S. PATENT DOCUMENTS 5,799,033 A * 8/1998 Baggen ...................... 375/250
6,188,717 B1 * 2/2001 Kaiser et al. ............... 375/148

OTHER PUBLICATIONS

Equalization and Coding for Extended MC–CDMA Over Time and Frequency Selective Channels—Jochem Egle, Markus Reinhardt, and Jurgen Lindner, University of Ulm, Dept. of Information Technology, Albert Einstein Allee 43 D–89081 Ulm, e–mail: egle@it.e–technik.uni–ulm.de.

DFT Algorithm for Time/Spectrum Simultaneous Spreading CDMA, Jinsong Duan, Ikuo Oka, and Chikato Fujiwara.

Iterative Detection Algorithm for Extended MC–CDMA, W.G. Teich, A. Bury, J. Egle, M. Nold, and J. Lindner, Information Technology, University of Ulm, D–89069 Ulm—Phone: +49–731–50–26258, Fax: +49–731–50–26259 E–mail: wt@it.e–technik.uni–ulm.de.

Ramjee Prasad, et al., "An Overview of Multi–Carrier CDMA," IEEE ISSSTA '96, Aug. 1996, pp. 107–114.

K. Sato, et al., The Institute of Electronics, Information and Communication Engineers, Technical Report of IEICE, SST98–56, vol. 98, No. 453, pp. 49–54, "Performance of OFDM/CDMA Using Differential Detection", Dec. 11, 1998.

* cited by examiner

*Primary Examiner*—Seema S. Rao
*Assistant Examiner*—Kevin C. Harper
(74) *Attorney, Agent, or Firm*—Oblon, Spivak, McClelland, Maier & Neustadt, P.C.

(57) ABSTRACT

The multicarrier transfer system employing the OFDM/CDMA modulation system comprises a transmitter having an S/P converter which two-dimensionally arranges spread signals for a transmission data array on a frequency and time axes system and then rearrange the spread signals for one transmission data array arranged two-dimensionally. The transmitter transmits the signals generated in the S/P converter. A receiver receives the signals transmitted by the transmitter and demodulates the signal to reconstruct the transmission data array.

11 Claims, 6 Drawing Sheets

MULTICARRIER TRANSFER SYSTEM AND MULTICARRIER MODULATION METHOD

FIELD OF THE INVENTION

The present invention relates to a multicarrier transfer system applied in the mobile communications system and digital broadcast system. More specifically, this invention relates to a multicarrier system employing the OFDM (Orthogonal Frequency Division Multiplex)/CDMA (Code Division Multiple Access) modulation system which is a type of multicarrier transfer system, and a modulation method for the same.

BACKGROUND OF THE INVENTION

A conventional multicarrier transfer system is explained below. Recently there is a strong tendency for employment of a digital modulation system or a digital transfer system for transferring video or audio data at a high speed in the fields of mobile communications and digital broadcasting. In the situation described above, now hot attention is concentrating on a multicarrier transfer system based on the OFDM/CDMA modulation system which is a type of multicarrier transfer system. The reasons why this system is attracting hot attention is that, there are advantages such that the capability of this system for suppression of the frequency-selective fading is excellent, the frequency diversity effect is obtained when this system is used together with the technology for error correction coding, it is possible to set a fine frequency interval between subcarriers in this system, and this system allows reduction in the effects due to inter-code interference because it is possible to set a guard interval between symbols in this system.

The OFDM/CDMA modulation system is a technology for subjecting a spectrum-spread signal to OFDM modulation. In this system a frequency interval is set in such a manner that the carriers will be orthogonal to each other within a symbol zone. Further, data transfer is executed by changing the amplitude and the phase of each carrier.

FIG. 6 shows an example of an outgoing signal in the OFDM/CDMA modulation system. It is assumed in this figure that there are eight subcarriers on the frequency axis, and outgoing signals transmitted to two different users are multiplexed and transmitted simultaneously. In FIG. 6, transmitted data arrays D1$m$ and D2$m$ in the transmitter are subjected to spread modulation with a spread code C1$n$ (n is an integer) and spread code C2$n$ (n is an integer) respectively. In other words, the subcarriers are subjected to spread modulation with spread code C11, C12, . . . , C18 and spread code C21, C22, . . . , C28 respectively. The multiplexed signals are then transmitted.

When a signal having been subjected to spread modulation and multiplexing by subcarrier unit passes through a frequency-selective transfer path in which a delayed wave is present, then subcarrier signals corresponding to spread chips are received in a state in which each of the subcarriers has a different amplitude and a different phase as shown in FIG. 7, for example. More specifically, S/N ratio of a spread chip that has been affected by the frequency-selective fading drops. The amplitude and the phase of the signal change in association with such a drop in the S/N ratio. In this case, a type of diversity effect is obtained under influence by the frequency-selective fading in each subcarrier.

In the multicarrier transfer system based on the conventional technology as described above, the spread code C2$n$, which is originally orthogonal code, is affected by the frequency-selective fading in the same way as the spread code C1$n$. Accordingly, the spread codes C1$n$ and C2$n$ having an amplitude and a phase which are different from the original ones are received. As a result, the orthogonality between the spread code C1$n$ and the spread code C2$n$ is lost, which causes an interference between the code as well as a degradation in the performance.

In the multicarrier transfer system based on the conventional technology, to prevent the influence of the frequency-selective fading, namely to keep constant the amplitude characteristics and phase characteristics of each chip, a method of, for instance, reducing a number of spread chips (namely a number of subcarriers) is available. However, in the method a spread gain is suppressed, and further it is required to suppress a number of multiplexed carriers when the carriers are subjected to CDMA multiplexing.

SUMMARY OF THE INVENTION

It is an object of the present invention to provide a multicarrier transfer system which makes it possible to provide a large number of chips when the OFDM/CDMA modulation system is employed in a transfer path where the frequency-selective fading occurs, and also which can improve, as the result, the spread gain and further can increase a number of multiplexed subcarriers also in the CDMA multiplexing.

According to the multicarrier transfer system according to one aspect of the present invention a spread signal rearrangement unit is provided which arranges, for instance, spread signals for two-chip cycle on a frequency axis, and then arranges a spread signals for four chip cycles on a time axis, so that a group of spread signals having in all eight chips is generated.

Further, the spread signal rearrangement unit arranges, for instance, spread signals for two-chip cycle on the frequency axis, and then arranges the spread signals for four chips on the time axis, so that a group of spread signals having in all eight chips is generated and then the spread signal rearrangement unit arranges the group of spread signals at randomly on the time axis.

Further, the spread signal rearrangement unit arranges for instance, spread signals for two chip cycles on the frequency axis, and then arranges the spread signals for four chip cycles on the time axis, so that a group of spread signals having in all eight chips is generated and the group of spread signals is arranged at randomly on the frequency axis.

Further, the spread signal rearrangement unit divided the spread signals into, for instance, four groups each comprising two spread signals, and arranges these groups within the OFDM signal in an interleaved fashion.

Further, the spread signal rearrangement unit selectively transmits an OFDM/CDMA signal suited to a state of a transfer path. Further, the spread signal rearrangement unit can arrange a ratio of spread chips allocated to a frequency axis and those to a time axis.

According to the multicarrier modulation method according to another aspect of the present invention a spread signal rearrangement step is provided in which, for instance, spread signals for two-chip cycle are arranged on a frequency axis, and then a spread signals for four chip cycles are arranged on a time axis, so that a group of spread signals having in all eight chips is generated.

Further, in the spread signal rearrangement step, for instance, spread signals for two-chip cycle on the frequency axis, and then arranges the spread signals for four chips are arranged on the time axis, so that a group of spread signals having in all eight chips is generated and then in the spread signal rearrangement step the group of spread signals is arranged at randomly on the time axis.

Further, in the spread signal rearrangement step, for instance, spread signals for two chip cycles are arranged on the frequency axis, and spread signals for four chip cycles are arranged on a time axis, so that a group of spread signals having in all eight chips is generated and the group of spread signals is arranged at randomly on the frequency axis.

Further, in the spread signal rearrangement step the spread signals are divided into, for instance, four groups each comprising two spread signals, and the groups are arranged within the OFDM signal in an interleaved fashion.

Further, in the spread signal rearrangement step, an OFDM/CDMA signal suited to a state of a transfer path is selectively transmitted. Further, in the spread signal rearrangement step, a ratio of spread chips allocated to a frequency axis and those to a time axis can be arranged.

Other objects and features of this invention will become apparent from the following description with reference to the accompanying drawings.

DESCRIPTION OF THE PREFERRED EMBODIMENTS

The multicarrier transfer system and the modulation method according to the present invention are described below with the help of drawings. However, this invention is not limited only to these embodiments.

Figure 1A:
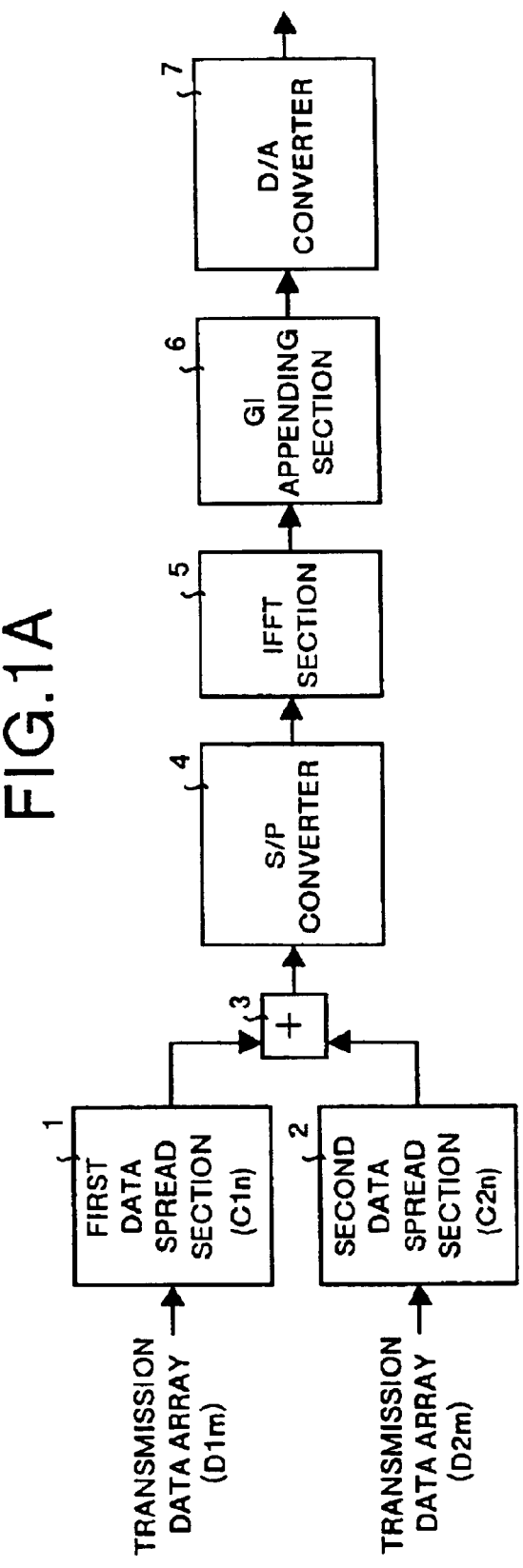
FIG. 1A and FIG. 1B show configuration of a multicarrier transfer system in which the OFDM/CDMA modulation system is employed.
Figure 1B:
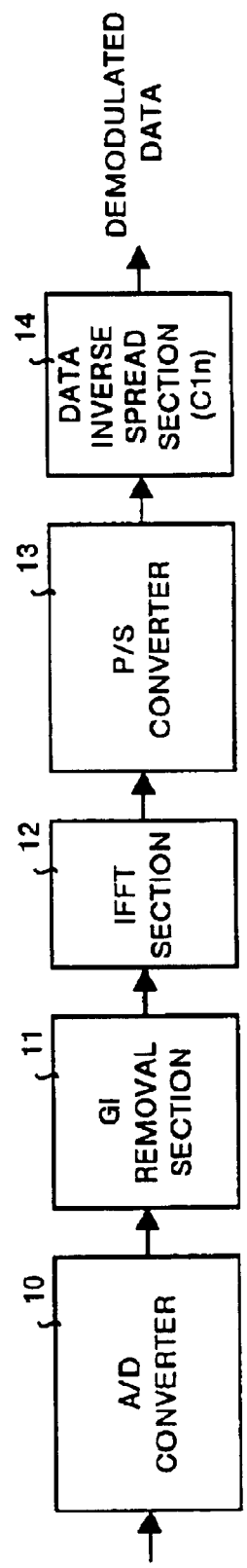

FIG. 1A and FIG. 2A show configuration of a multicarrier transfer system based on the OFDM/CDMA modulation system. FIG. 1A shows a configuration of a transmitter, while FIG. 1B shows a configuration of receiver. An apparatus constituting this system may comprise both, the transmitter and the receiver, or may comprise any one, the transmitter or the receiver.

In FIG. 1A, 1 represents a first data spread section, 2 represents a second data spread section, 3 represents a combiner, 4 represents a serial/parallel converter (hereinafter, S/P converter), 5 represents an inverse fast Fourier transform section (hereinafter, IFFT section), 6 represents a guard interval appending section (hereinafter, GI appending section), and 7 represents a digital/analog converter (hereinafter, D/A converter). On the other hand, in FIG. 1B, 10 represents an analog/digital converter (hereinafter, A/D converter), 11 represents a guard interval removal section (hereinafter, GI removal section), 12 represents a fast Fourier transform section (hereinafter, FFT section), 13 represents a parallel/serial converter (hereinafter, P/S converter), and 14 represents a data inverse spread section.

Operations of the transmitter and receiver are explained below. The transmitter spreads a transmission data array D1$m$ shown in FIG. 1A using a known spread code C1$n$ in the first data spread section 1. Furthermore, the transmitter spreads a transmission data array D2$m$, to be transmitted to other user, using a known spread code C2$n$ in the second data spread section 2. The two outputs are combined in the combiner 3. It is assumed in this embodiment that the spread code C1$n$ and spread code C2$n$ are orthogonal to each other.

The signal output from the combiner 3 is converted from a serial signal to a parallel signal in the S/P converter 4. The obtained parallel signal is then transformed into a time axis waveform by the application of the inverse fast Fourier transformation in the IFFT section 5. A guard interval is appended to the signal output from the IFFT section 5 in the GI appending section 6 so as to obtain a digital OFDM signal. Finally, the digital OFDM signal is converted by the D/A converter 7 into an analog signal, and the analog OFDM signal is transmitted to the receiver as transmission signal. In the following description, this transmission signal will be referred to as OFDM/CDMA signal. The guard interval signal is a signal which is set in order to incorporate the influence of a delay signal generated due to a reflected signal from the buildings or the like. The guard interval signal is commonly used in the OFDM modulation signal.

The receiver receives the OFDM/CDMA signal. The A/D converter 10 in the receiver converts the received analog OFDM/CDMA signal into a digital signal with. The guard interval is removed in the GI removal section 11. The signal, from which the guard interval has been removed, is subjected to fast Fourier transformation in the FFT section 12 so that the time axis waveform is converted to a frequency axis waveform. The parallel signal output from the FFT section 12 is then converted into a serial signal in the P/S converter 13. The serial signal is then provided to the data inverse spread section 14.

For instance, when spread code for the target user is C1$n$, the data inverse spread section 14 multiplies the spread code C1$n$ specific to the target user to the received serial signal. Accordingly the transmission data array D1$m$ is regenerated in the data inverse spread section 14. The simultaneously received data array D2$m$ spread with the spread code C2$m$ is removed due to mutual orthogonality between the spread code C1$n$ and spread code C2$n$. Further, influence of a delayed wave caused due to the reflection from the buildings or the like is removed because of removal of the guard interval from the OFDM signal.

Figure 6:
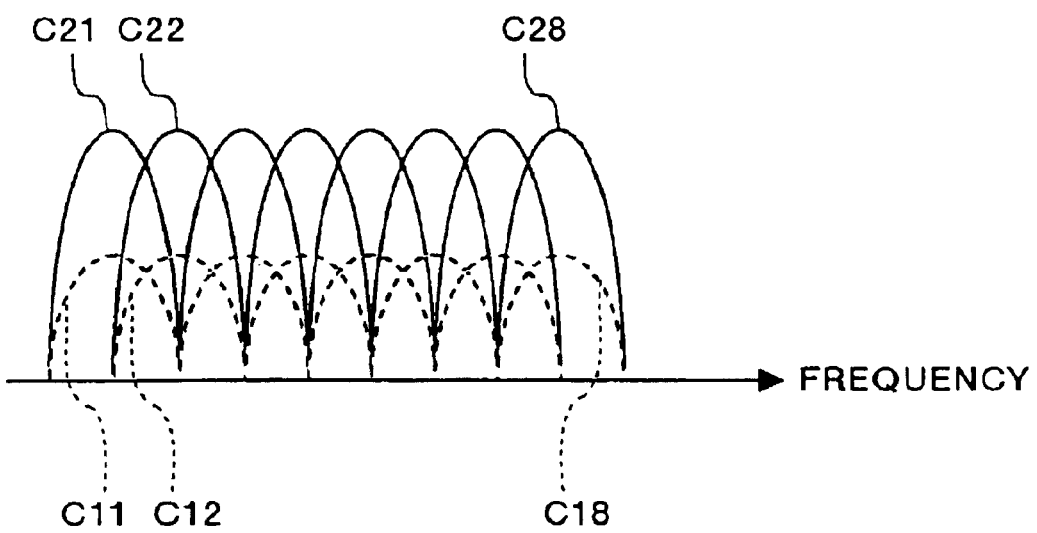
FIG. 6 shows one example of an outgoing signal in the OFDM/CDMA modulation system.
Figure 7:
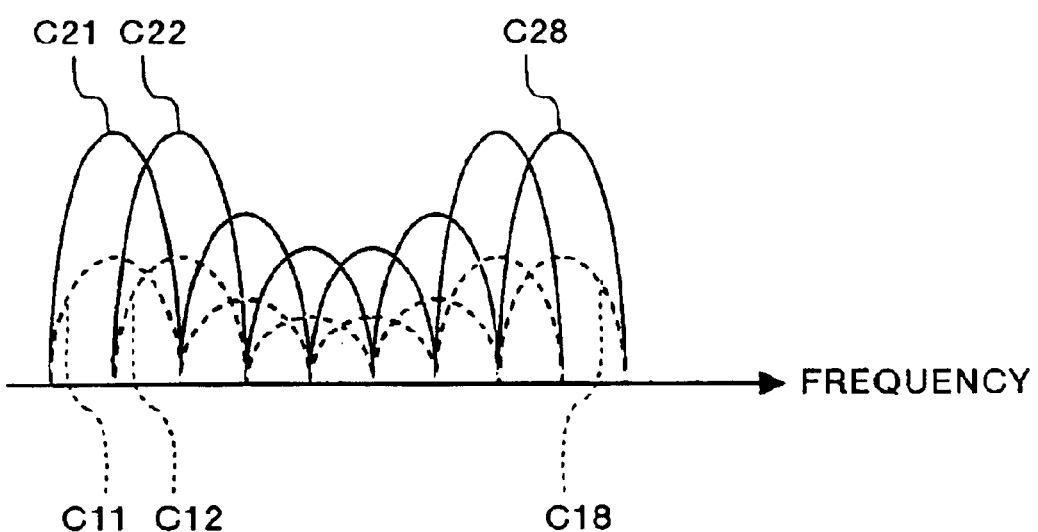
FIG. 7 shows one example of an incoming signal affected by the frequency-selective fading.

The multicarrier transfer system described above in general case transmits the OFDM/CDMA signal so as to spread one block of data over a plurality of subcarriers on a frequency axis as shown in FIG. 6 and FIG. 7. In this method, however, when the signal passes through a transfer path in which the frequency-selective fading is taking place, a data error occurs in a subcarrier corresponding to a frequency affected by the frequency-selective fading. The error is generated all the time in the particular data transferred using this subcarrier.

Figure 2:
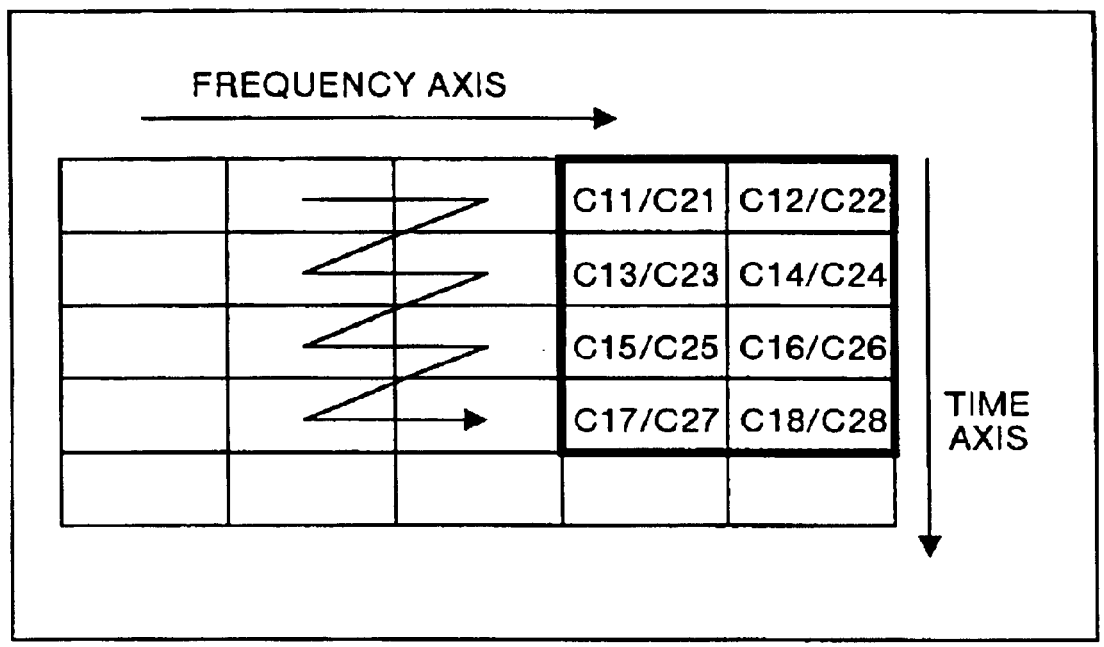
FIG. 2 shows a format of an OFDM/CDMA signal according to a first embodiment of the present invention.

In the multicarrier modulation method according to the present embodiment, influence of the frequency-selective fading is reduced by changing the arrangement of the data during the generation of the OFDM/CDMA signal. FIG. 2 shows a format of the OFDM/CDMA signal in this embodiment. A spread signal of the transmission data array is arranged two-dimensionally on a frequency and time axes system. The area surrounded by a solid line in this figure indicates one data array. In other words, the area surrounded by the solid line is a data array comprising eight subcarriers which has been explained with reference to FIG. 6. The area surrounded by the solid line is described as frequency pair group hereinafter. Frequency pair groups are regularly allocated in spread chips shown in the figure, and spread signals spread with the spread code C1n and C2n are multiplexed in each chip (C11/C21, C12/C22, . . . ).

This embodiment is a case where, for instance, signals for two chip cycles spread in the first data spread section 1 and second data spread section 2 are arranged on a frequency axis in the S/P converter 4, and further spread signals for four cycles are arranged on a time axis. In all eight spread signals are arranged. By executing the processing as described above, as compared to a case where spread signals for eight chip cycles are simply arranged on a frequency axis like in the conventional technology, influence of the frequency-selective fading can be reduced to a quarter of the original influence level. Namely, assuming that there are eight subcarriers, one chip out of eight chips (one data array) is always affected by the frequency-selective fading in the conventional technology, however not more than one of four data arrays is affected by the frequency-selective fading in this embodiment.

Thus, signal to noise ratio is improved according to this embodiment. Accordingly, a number of spread chips can be increased as compared to that in the conventional technology, in addition, a larger spread gain can be obtained. Further, a number of carriers in the CDMA multiplexing can be increased as compared to that allowable in the conventional technology.

Figure 3:
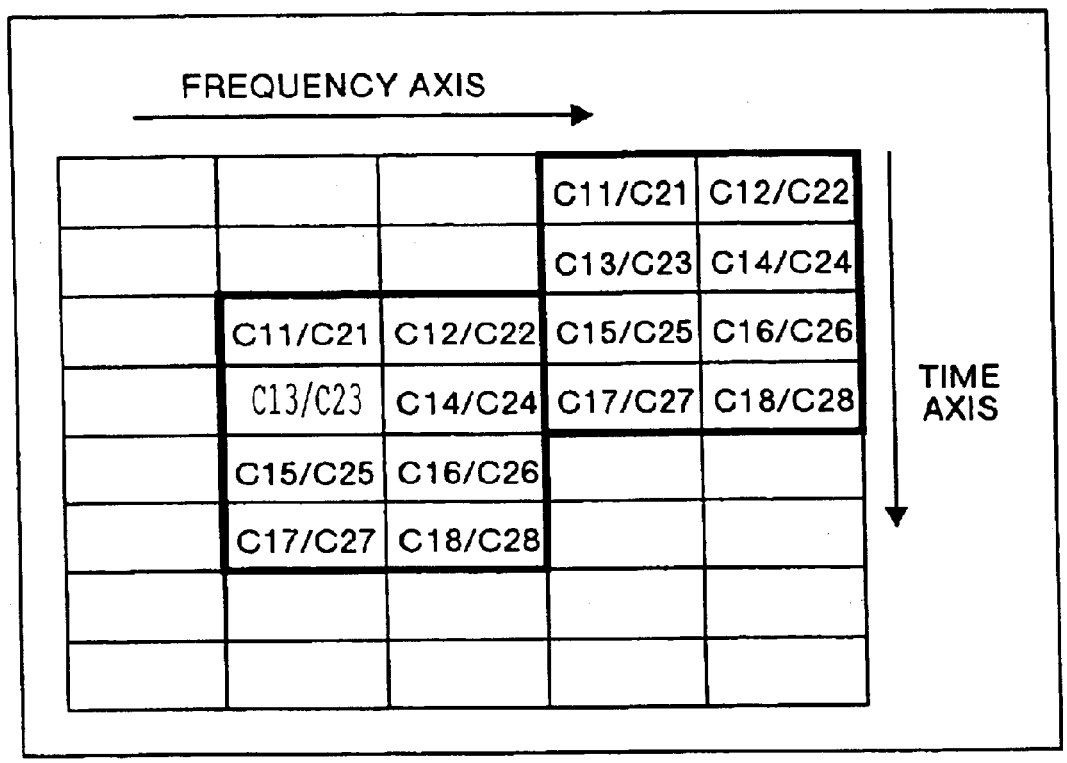
FIG. 3 shows a format of an OFDM/CDMA signal according to a second embodiment of the present invention.

FIG. 3 shows a format of the OFDM/CDMA signal according to the second embodiment of the present invention. Configuration of the multicarrier transfer system according to the second embodiment is the same as that shown in FIG. 1A and FIG. 1B. Therefore, explanation of the configuration of the multicarrier transfer system according to the second embodiment will be omitted. Only the portions that are different from the first embodiment will be explained here.

In the first embodiment, a case is explained in which groups of spread signals spread with a pair of different frequencies are two-dimensionally arranged on the frequency and time axes system with a regularity. However, if the spread signals are arranged with a regularity, when the same data is transmitted in succession, for instance, the combined signal becomes the same. Thus, there is a disadvantage that the transmission waveform and transmission spectrum will be the same.

To overcome this problem, in this second embodiment, for instance signals spread in the first data spread section 1 and second data spread section 2 for two chip cycles are arranged on the frequency axis in the S/P converter 4, and then spread signals for four chip cycles are arranged on the time axis, so that a group of spread signals having in all eight chips is generated. Further, arrangement of the spread signals corresponding to the generated frequency pair groups is shifted on the time axis to generate an OFDM/CDMA signal.

Because of the above arrangement, even if the same signal is transmitted in succession, the combined signal changes due to the shift effect on the time axis. Therefore, the transmission spectrum will not be the same, and in association with this phenomenon the same effect as that achieved by the scramble processing can be obtained.

Figure 4:
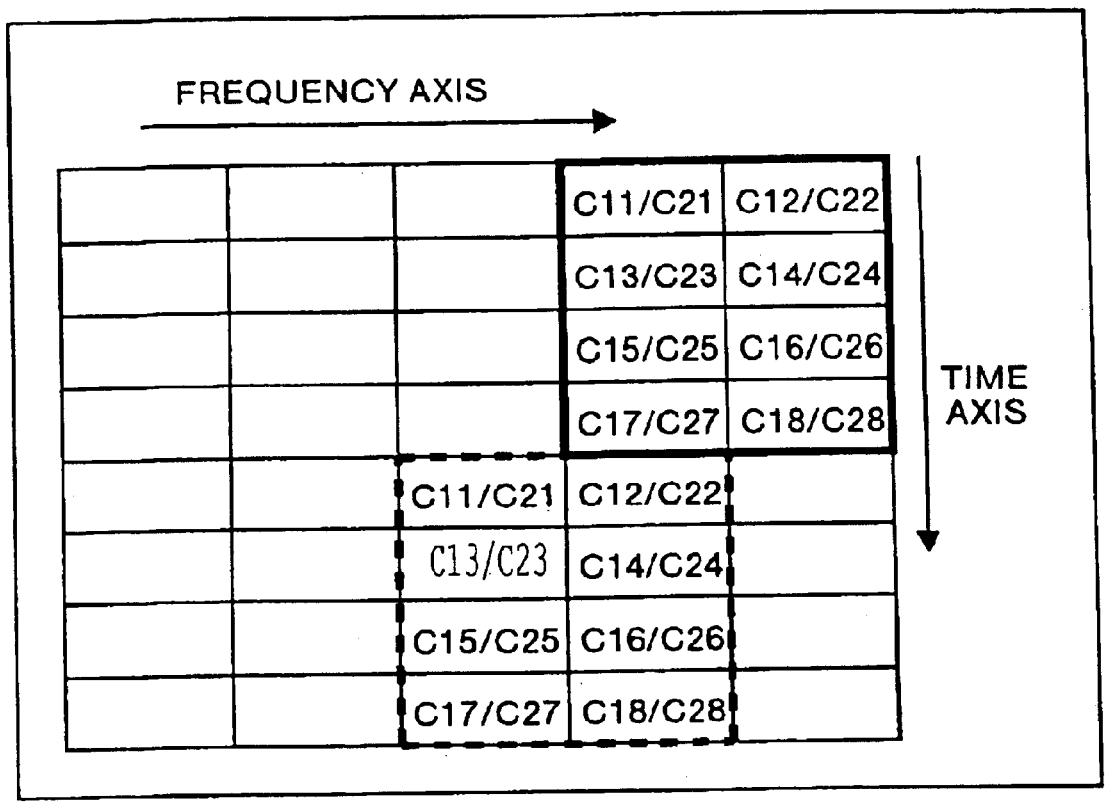
FIG. 4 shows a format of the OFDM/CDMA signal according to a third embodiment of the present invention.

FIG. 4 shows a format of the OFDM/CDMA signal according to a third embodiment of the present invention. Configuration of the multicarrier transfer system according to the third embodiment is the same as that shown in FIG. 1A and FIG. 1B. Therefore, explanation of the configuration of the multicarrier transfer system according to the third embodiment will be omitted. Only the portions that are different from the first and second embodiment will be explained here.

In the first embodiment, a case is explained in which groups of spread signals spread with a pair of different frequencies are two-dimensionally arranged on the frequency and time axes system with a regularity. However, if the spread signals are arranged with a regularity, when there occurs the influence of the frequency-selective fading, the influence continues. In other words, when an array of signals spread with the spread signal in FIG. 1A is affected by the frequency-selective fading, other arrays of signals spread with the spread code C11 are also affected by the frequency-selective fading, which may cause a data error.

To overcome this problem, in this third embodiment, for instance, signals for two chip cycles spread in the first data spread section 1 and second data spread section 2 are arranged by the S/P converter 4 on the frequency axis, and then spread signals for four chip cycles are arranged on the time axis, so that a frequency pair group having in all eight chips is generated. Further, arrangement of the spread signals corresponding to the generated frequency pair group on the frequency axis is shifted to generate an OFDM/CDMA signal.

Because of the above arrangement, even if there occurs the influence of frequency-selective fading, the influence can be diffused over a wide area.

Figure 5:
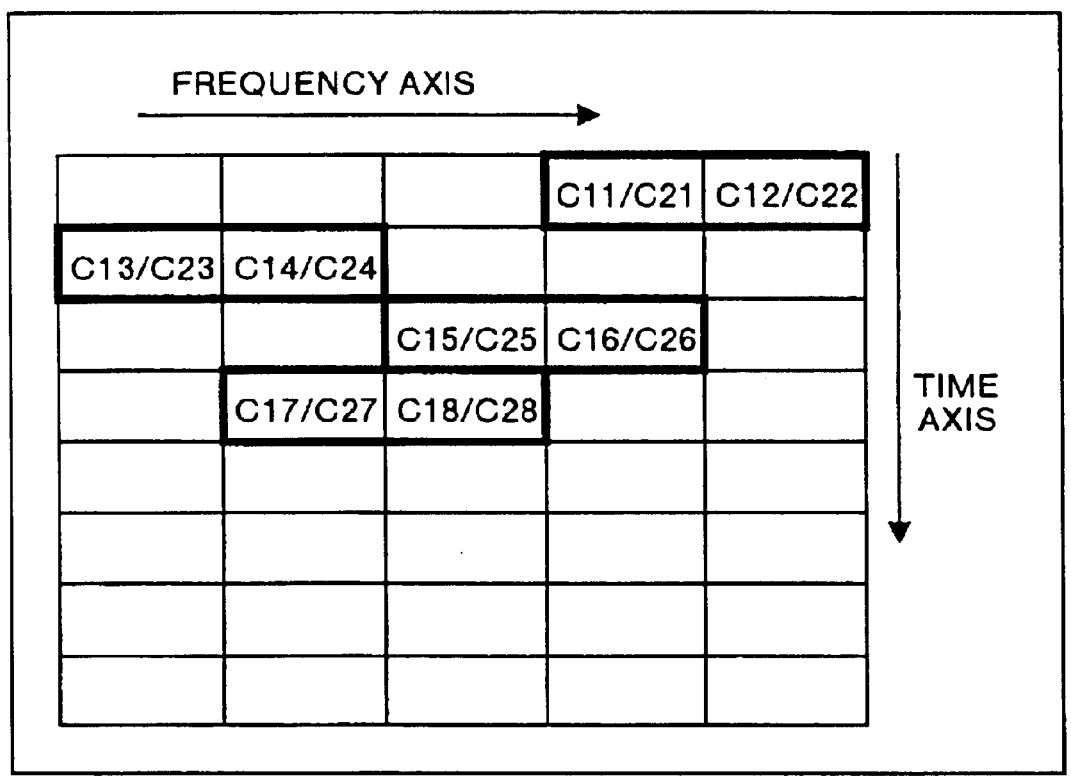
FIG. 5 shows a format of the OFDM/CDMA signal according to a fourth embodiment of the present invention.

FIG. 5 shows a format of the OFDM/CDMA signal according to the fourth embodiment of the present invention. Configuration of the multicarrier transfer system according to the third embodiment is the same as that shown in FIG. 1A and FIG. 1B. Therefore, explanation of the configuration of the multicarrier transfer system according to the third embodiment will be omitted. Only the portions that are different from the first, second and third embodiment will be explained here.

The fourth embodiment is a case where spread chips are arranged on a frequency axis and a time axis so that influence of frequency-selective fading can be reduced and further the interleave effect can be obtained. In this embodiment, spread signals are divided, for instance, into four groups each comprising those for two chips in a spread signal rearrangement step, and the groups are arranged within an OFDM signal for affecting interleave.

In the receiver, the inverse spread processing (partially inverse spread processing) is executed for each group. Namely, the partially relative processing can be executed. In the receiver, then by using a signal subjected to this partially relative processing, such processing as determination on majority or maximum ratio synthesis processing is executed to obtain final demodulated data.

As described above, in this embodiment, offset of amplitude characteristics and phase characteristics due to the frequency-selective fading is confined within each group, and further the same demodulated data as those obtained by increasing a number of spread chips can be obtained. Further, in the inverse spread processing in a receiver, the interleave effect can be obtained, and the performance for communications can further be improved.

In the fifth embodiment, the S/P converter 4 has all the functions of the S/P converter 4 according to the first to fourth embodiments, and an OFDM/CDMA signal that is the best for the present state of the transfer path is selectively transmitted using the proper function. Further, by making it possible to change a ratio of spread chips allocated on a frequency axis vs those allocated on a time axis in response to a state of a transfer path, the present invention can easily be applied to a transfer path affected by a transfer path in which the frequency-selective fading occurs, or to a transfer path in which a time-related change is large.

Because of the features described above, all of the OFDM/CDMA signals described above can be realized, and all of the effects described above can be realized.

As described above, according to the multicarrier transfer system of the present invention, a spread signal rearrangement unit is provided which arranges, for instance, spread signals for two-chip cycle on a frequency axis, and then arranges a spread signals for four chip cycles on a time axis, so that a group of spread signals having in all eight chips is generated. With this configuration, as compared to a case where spread signals for eight chips are simply arranged on a frequency axis like in the conventional technology, it is possible to suppress influence of the frequency-selective fading to a quarter. Further as the S/N ratio is improved, it is possible to increase a number of spread chips as compared to that in the conventional technology, and to realize a larger spread gain. Further, it is possible to increase also a number of spread signals in the CDMA multiplexing as compared to that in the conventional technology.

Further, the spread signal rearrangement unit arranges, for instance, spread signals for two-chip cycle on the frequency axis, and then arranges the spread signals for four chips on the time axis, so that a group of spread signals having in all eight chips is generated and then the spread signal rearrangement unit arranges the group of spread signals at randomly on the time axis. With this configuration, even when the same data is transmitted, a combined signal fluctuates due to the shift effect on the time axis with the transmission spectrum not kept constant. Consequently, the same effect like that when the scramble processing is executed can be obtained.

Further, the spread signal rearrangement unit arranges for instance, spread signals for two chip cycles on the frequency axis, and then arranges the spread signals for four chip cycles on the time axis, so that a group of spread signals having in all eight chips is generated and the group of spread signals is arranged at randomly on the frequency axis. With this configuration, even if an influence of the frequency-selective fading is present, the influence can be diffused over a wide area.

Further, the spread signal rearrangement unit divided the spread signals into, for instance, four groups each comprising two spread signals, and arranges these groups within the OFDM signal in an interleaved fashion. Accordingly, influence of the frequency-selective fading can be reduced, and further the interleave effect can be obtained.

Further, the spread signal rearrangement unit selectively transmits an OFDM/CDMA signal suited to a state of a transfer path. Further, the spread signal rearrangement unit can arrange a ratio of spread chips allocated to a frequency axis and those to a time axis. Because of this feature, the multicarrier transfer system can easily be applied to a transfer path which is easily affected by a frequency-selective fading transfer path or a transfer path with a large time-related fluctuation.

According to the multicarrier modulation method of the present invention, a spread signal rearrangement step is provided in which, for instance, spread signals for two-chip cycle are arranged on a frequency axis, and then a spread signals for four chip cycles are arranged on a time axis, so that a group of spread signals having in all eight chips is generated. With this configuration, as compared to a case where spread signals for eight chips are simply arranged on a frequency axis like in the conventional technology, it is possible to suppress influence of the frequency-selective fading to a quarter. Further as the S/N ratio is improved, it is possible to increase a number of spread chips as compared to that in the conventional technology, and to realize a larger spread gain. Further, it is possible to increase also a number of spread signals in the CDMA multiplexing as compared to that in the conventional technology.

Further, in the spread signal rearrangement step, for instance, spread signals for two-chip cycle on the frequency axis, and then arranges the spread signals for four chips are arranged on the time axis, so that a group of spread signals having in all eight chips is generated and therein the spread signal rearrangement step the group of spread signals is arranged at randomly on the time axis. With this configuration, even when the same data is transmitted, a combined signal fluctuates due to the shift effect on the time axis with the transmission spectrum not kept constant. Consequently, the same effect like that when the scramble processing is executed can be obtained.

Further, in the spread signal rearrangement step, for instance, spread signals for two chip cycles are arranged on the frequency axis, and spread signals for four chip cycles are arranged on a time axis, so that a group of spread signals having in all eight chips is generated and the group of spread signals is arranged at randomly on the frequency axis. With this configuration, even if an influence of the frequency-selective fading is present, the influence can be diffused over a wide area.

Further, in the spread signal rearrangement step the spread signals are divided into, for instance, four groups each comprising two spread signals, and the groups are arranged within the OFDM signal in an interleaved fashion. Thus, influence of the frequency-selective fading can be reduced, and the interleave effect can be obtained.

Further, in the spread signal rearrangement step, an OFDM/CDMA signal suited to a state of a transfer path is selectively transmitted. Further, in the spread signal rearrangement step, a ratio of spread chips allocated to a frequency axis and those to a time axis can be arranged. Because of this feature, the multicarrier transfer system can easily be applied to a transfer path which is easily affected by a frequency-selective fading transfer path or a transfer path with a large time-related fluctuation.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A multicarrier transfer system based on an OFDM/CDMA modulation system, said multicarrier transfer system comprising:

a spread signal rearrangement unit which two-dimensionally arranges spread signals for a transmission data array on a frequency axis and a time axis first, and then rearranges the group of spread signals two-dimensionally arranged for one transmission array in a regular pattern, wherein a transmission side transmits a signal generated by said spread signal rearrangement unit by time axis unit, and a reception side restructures the transmission data array by demodulating the received signals, and said spread signal rearrangement unit can change an arrangement ratio of the two-dimensionally arranged signals on the frequency axis and time axis based on the conditions of a transfer path.

2. The multicarrier transfer system according to claim 1, wherein said spread signal rearrangement unit arranges the group of two-dimensionally arranged spread signals for one transmission data array in a random pattern.

3. The multicarrier transfer system according to claim 1, wherein said spread signal rearrangement unit rearranges the group of two-dimensionally arranged spread signals for one transmission data array on the frequency axis in a random pattern.

4. The multicarrier transfer system according to claim 1, wherein said spread signal rearrangement unit divides the group of two-dimensionally arranged spread signals for one transmission data into several partial arrays and rearranges the partial arrays within an OFDM signal in a random pattern.

5. A multicarrier transfer method applied in a multicarrier transfer system based on an OFDM/CDMA modulation system, said method comprising the steps of:

two-dimensionally arranging spread signals for one transmission data array on a frequency axis and a time axis; and a step of rearranging the group of two-dimensionally arranged signals for one transmission data system in a regular pattern; and wherein, in the spread signal rearrangement step, an arrangement ratio of the two-dimensionally arranged signals on a frequency axis and a time axis can be changed based on the conditions of a transfer path.

6. The multicarrier modulation method according to claim 5, wherein, in the spread signal rearrangement step, the group of two-dimensionally arranged signals on the time axis are rearranged in a random pattern.

7. The multicarrier modulation method according to claim 5, wherein, in the spread signal rearrangement step, the group of two-dimensionally arranged signals for one transmission data array are rearranged on the frequency axis in a random pattern.

8. The multicarrier modulation method according to claim 5, wherein, in the spread signal rearrangement step, the group of two-dimensionally arranged signals are divided into a plurality of partial arrays and the partial arrays are rearranged within an OFD signal in a random pattern.

9. A multicarrier transfer system based on the OFDM/CDMA modulation system, said system comprising:

a transmitter having, a spread signal rearrangement unit which receives spread signals obtained by spreading of a transmission data array, a) two-dimensionally arranges the received spread signals on a frequency-time axes system, and b) rearranges on the frequency-time axes system in a regular pattern a group of spread signals to obtain a transmission signal, and a transmission unit which processes the transmission signal and transmits the processed transmission signal, and a receiver having, a receiving unit which receives the transmission signal, and a demodulating unit which reconstructs the transmission data array by demodulating the transmitting signals, wherein said spread signal rearrangement unit can change an arrangement ratio of the two-dimensionally arranged signals on the frequency axis and time axis based on the conditions of a transfer path.

10. A multicarrier transfer system based on an OFDM/CDMA modulation system, said multicarrier transfer system comprising:

a spread signal rearrangement unit which two-dimensionally arranges spread signals for a transmission data array on a frequency axis and a time axis first, and then rearranges the group of spread signals two-dimensionally arranged for one transmission array in a regular pattern, wherein a transmission side transmits a signal generated by said spread signal rearrangement unit by time axis unit, and a reception side restructures the transmission data array by demodulating the received signals, and said spread signal rearrangement unit divides the group of two-dimensionally arranged spread signals for one transmission data into several partial arrays and rearranges the partial arrays within an OFDM signal in a random pattern.

11. A multicarrier transfer method applied in a multicarrier transfer system based on an OFDM/CDMA modulation system, said method comprising the steps of:

two-dimensionally arranging spread signals for one transmission data array on a frequency axis and a time axis, and a step of rearranging the group of two-dimensionally arranged signals for one transmission data system in a regular pattern, wherein, in the spread signal rearrangement step, the group of two-dimensionally arranged signals are divided into a plurality of partial arrays and the partial arrays are arranged within an OFDM signal in a random pattern.

* * * * *